(12) United States Patent
Almohsin et al.

(10) Patent No.: US 12,503,940 B2
(45) Date of Patent: Dec. 23, 2025

(54) USAGE OF AN ARTIFICIAL FRACTURE SETUP FOR GEL EVALUATION

(71) Applicant: SAUDI ARABIAN OIL COMPANY, Dhahran (SA)

(72) Inventors: Ayman M. Almohsin, Dhahran (SA); Dongqing Cao, Beijing (CN); Ming Han, Dhahran (SA); Bader G. Alharbi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/000,877

(22) PCT Filed: May 5, 2022

(86) PCT No.: PCT/CN2022/090982
§ 371 (c)(1),
(2) Date: Dec. 6, 2022

(87) PCT Pub. No.: WO2023/212864
PCT Pub. Date: Nov. 9, 2023

(65) Prior Publication Data
US 2025/0052146 A1  Feb. 13, 2025

(51) Int. Cl.
*E21B 47/117* (2012.01)
*G01N 11/08* (2006.01)

(52) U.S. Cl.
CPC ................... *E21B 47/117* (2020.05)

(58) Field of Classification Search
CPC ...... G01N 11/08; G01N 15/082; G01N 11/04; G01N 1/28; G01N 15/08; G01N 29/14;
(Continued)

(56) References Cited

U.S. PATENT DOCUMENTS 8,306,751 B2 * 11/2012 Rickman ............... G01N 13/02
702/11
2017/0191345 A1   7/2017 Van Dongen

FOREIGN PATENT DOCUMENTS

CN   104632204 A   5/2015
CN   105569651 B   11/2016
(Continued)

OTHER PUBLICATIONS

Ze Wang "PLugging performance of preformed particle gels in fractures and its influencing factors" Doctoral Dissertations (2019) (174 pages).
(Continued)

*Primary Examiner* — Brandi N Hopkins
(74) *Attorney, Agent, or Firm* — Osha Bergman Watanabe & Burton LLP

(57) ABSTRACT

A system and method of testing pre-formed particle gels in an artificial fracture system includes introducing a suspension including a pre-formed particle gel into a testing device that includes an artificial fracture setup with a plurality of fracture model units. The system is configured to inject pre-formed particle gels into an accumulator with magnetic stirrers first and then into a series of fracture model units configured to receive a fluid through a flow channel and, change the flow channel in a transverse direction relative to the direction of the fluid flow.

11 Claims, 4 Drawing Sheets

(58) Field of Classification Search
CPC ........ E21B 43/26; E21B 49/008; E21B 47/07; E21B 47/065; E21B 43/25; G06Q 10/0639; C09K 8/584
See application file for complete search history.

(56) References Cited

FOREIGN PATENT DOCUMENTS

| CN | 208073471 U | 11/2018 |
|---|---|---|
| CN | 110359876 A | 10/2019 |
| CN | 112268981 A | 1/2021 |
| CN | 113640467 A | 11/2021 |
| CN | 215520857 U | 1/2022 |
| CN | 114198084 A | 3/2022 |

OTHER PUBLICATIONS

H. Zhang et al. "Preformed-Particle-Gel Transport Through Open Fractures and Its Effect on Water Flow." SPE Journal 16 (2011): 388-400. https://doi.org/10.2118/129908-PA (13 pages).

A. Imqam et al. "Effect of Heterogeneity on Propagation, Placement, and Conformance Control of Preformed Particle Gel Treatment in Fractures" Paper presented at the SPE Improved Oil Recovery Conference, Tulsa, Oklahoma, USA, Apr. 2016. doi: https://doi.org/10.2118/179705-MS (23 pages).

P. A. Khoshkar et al. "Static and dynamic evaluation of the effect of nanomaterials on the performance of a novel synthesized PPG for water shut-off and improved oil recovery in fractured reservoirs." Journal of Petroleum Science and Engineering 189.2(2020): 107019. https://doi.org/10.1016/j.petrol.2020.107019 (17 pages).

L. Sun et al. "Water plugging performance of preformed particle gel in partially filled fractures" Industrial & Engineering Chemistry Research (2019). https://doi.org/10.1021/acs.iecr.9b00128 (7 pages).

M. Abdulfarraj et al. "The Potential of using Micro-Sized Cross-linked Polymer Gel to Remediate Water Leakage in Cement Sheaths" Missouri University of Science and Technology, Scholars' Mine; https://doi.org/10.1007/s13202-019-00783-6; Sep. 1, 2019 (12 pages).

International Search Report and Written Opinion issued in Corresponding Applicaiton No. PCT/CN2022/090982, mailed Dec. 29, 2022, 10 pages.

* cited by examiner

USAGE OF AN ARTIFICIAL FRACTURE SETUP FOR GEL EVALUATION

BACKGROUND

Hydrocarbon resources, including oil and gas, are typically located below the surface of the earth in subterranean porous rock formations. To access these resources, wells are drilled to extract the hydrocarbon fluids from the reservoir. Fracturing is a common technique in reservoir stimulation and to access hydrocarbons in the formation. Enhanced oil recovery (EOR) methods may be used to extract oil from a reservoir that may not otherwise be extractable from fractured reservoirs using conventional primary methods of recovery. EOR operations may generally include injecting a fluid (e.g., a gas, a polymer mixture, a foam, or a liquid) down an injection well to alter the downhole formation pressure and/or improve oil displacement or fluid flow in the reservoir. The main challenge of enhanced oil recovery (EOR) is to ensure contact between the injected fluids, and the hydrocarbons reserved in a reservoir.

In fractured reservoirs, the permeability of hydrocarbon-bearing rock may vary, and the injected fluids tend to pass or channel through the highly permeable layers, and therefore, do not reach less permeable layers although the hydrocarbon quantity may not vary in these rock layers. This is referred to as a conformance problem. Because of this conformation problem, the displaceable oil from the unswept areas of the rock formation may not be recovered fully. To overcome conformance issues, various techniques are utilized to permit circulation of the remaining hydrocarbons in the different zones of a reservoir to a more adequate conformance condition. One of such techniques is the utilization of plugging agents. Plugging agents are widely used to increase hydrocarbon production from fractured reservoirs. By injecting plugging agents in a fracture, the highly permeable zones may be sealed; this technique increases redistributing the injected fluids to zones with lower permeability and therefore, overall reduces water cut and increases well productivity. Gels including in situ gels and pre-formed particle gels (PPG) are commonly used as plugging agents to resolve conformance control problems.

Pre-formed particle gel (PPG) treatments are used in EOR applications in order to effectively control conformance problems, water shutdown, and ensure fluid diversion in heterogeneous fractured reservoirs. When injected into a fractured reservoir, PPGs can form a gel pack, block the high permeability zones within the fracture, and this helps divert the fluid to flow to the adjacent matrix, such as towards the low permeability zone, and recover the trapped oil in the formations. This helps maximize oil recovery and well productivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for testing gels to use in conformance control in an artificial fracture setup. The systems may include a pump, an accumulator, and an artificial fracture setup—all connected in series. The system may also include a pressure measurement system for the measurement of pressure at various points in the system. A gel suspension may be introduced in the accumulator having a magnetic stirrer inside that may ensure continuous mixing of the suspension. The pump may include a hydraulic fluid that may pressurize the suspension contained in the accumulator to flow through an out port. The artificial fracture setup is configured to receive the suspension flowing from the accumulator through a flow channel. The pressure measurement system may include pressure sensors connected to the artificial fracture setup to measure the pressures of various zones in the artificial fracture setup.

In another aspect, embodiments disclosed herein relate to a method of testing gels to use in conformance control in an artificial fracture setup. The method may include the first preparation of a gel suspension containing at least a gel-type plugging agent. Next, the suspension may be introduced into an accumulator with a magnetic stirrer that ensures continuous mixing. Further, a pump with a hydraulic fluid may be utilized for pressurizing the suspension in the accumulator to flow, and for injection of the suspension from the accumulator into an artificial fracture setup. The gel particles may get stuck in the fractures of the artificial fracture setup and restrict flow. This may result in an increase in pressure within the fractures. A pressure measurement system may include pressure sensors in communication with the fractures in the artificial fracture setup that may monitor the pressure change within the fractures due to restricted flow and may provide real-time pressure data during testing.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
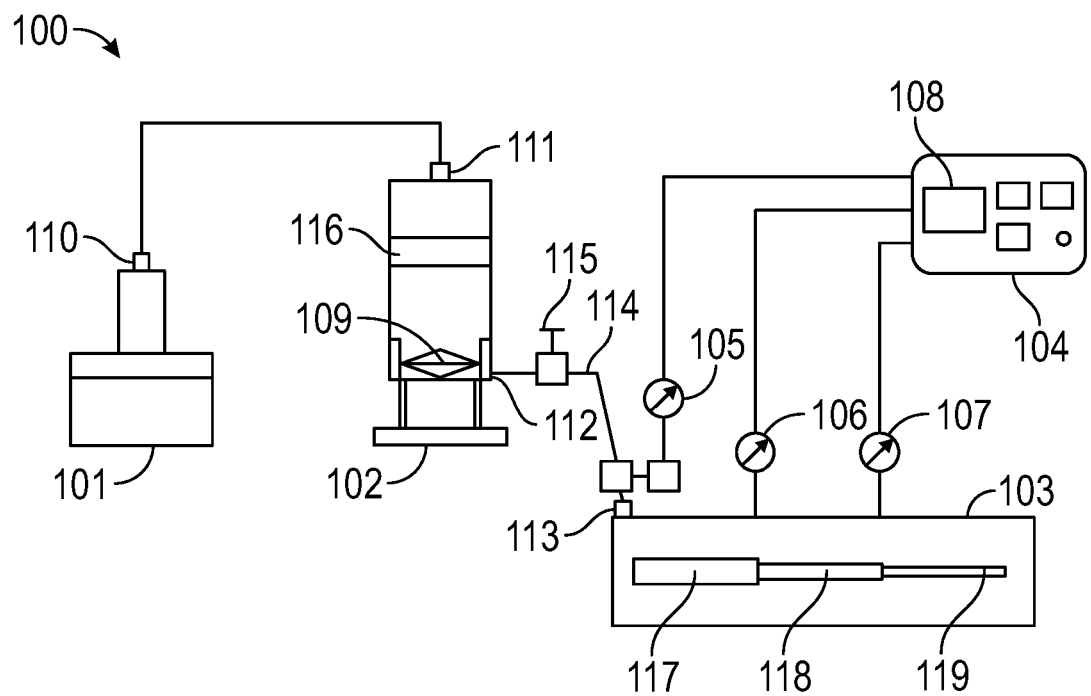
FIG. 1 is a schematic for an artificial fracture setup for gel evaluation according to embodiments herein.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements. The term "conformance" refers to a measure of the uniformity of the flood front of the injected drive fluid during an oil recovery flooding operation as it is being propagated through an oil reservoir.

The term "conformance control" means any action taken to improve the injection or production profile of a hydrocarbon well. This may refer to procedures that enhance recovery efficiency, improve wellbore/casing integrity, and satisfy environmental regulations.

The term "simulated fracture", as used in one or more embodiments of the disclosure, is understood to be the space between the two plates of an artificial fracture setup as depicted in one or more of the embodiments.

The term "plugging agent" or "blocking agent" means a chemical or component used to plug or block off selected permeable zones of a formation.

The term "suspension" means a heterogeneous mixture in which the solute particles do not dissolve, but get suspended throughout the bulk of the solvent, left floating around freely in the medium. The internal phase is dispersed throughout the external phase, as a stable dispersion, or through mechanical agitation, with the use of certain excipients or suspending agents in some embodiments.

The term "gel" refers to a soft, solid, or solid-like material consisting of two or more components, one of which is a liquid, present in substantial quantity. Gels are widely used as plugging agents and can be used in different forms including pre-formed particle gel (PPG) and in situ gels, where the polymer solution and crosslinker are injected into the reservoir to form a three-dimensional (3D) gel network in the bottom of the oil well.

The term "pre-formed particle gel (PPG)" means a particulate, superabsorbent polymeric system, particle gels, or composite systems. Polymeric systems mean a gel network comprising polymers that are cross-linked with other metallic or organic chemicals. Particle gels mean a network of aggregated colloidal particles with soft solid-like mechanical properties. Composite gels mean a gel network constructed by oil bodies with at least a cross-linking inorganic, or organic chemical. PPG can swell up to 200 times its original size in brine. PPG is often used as a blocking agent or a chemical that can be used in stimulation treatments over an area to be treated to ensure uniform injection for creating fractures. When injected into the reservoirs, the PPG enters the fracture with the carrier water and forms a gel pack, which blocks the fracture and diverts the flow to the adjacent matrix. Preformed particle gels (PPGs) are larger than other commercially available blocking/plugging agents and preferentially penetrate high permeability zones, leaving the low permeability zones undamaged. PPG may function to divert a flow by creating a temporary blocking effect that is safely cleaned up following another conventional cleaning treatment, enabling enhanced productivity throughout the treated interval.

In one or more embodiments, the terms "gel", "PPG", "blocking agent", and "plugging agent" may be used alternatively.

In one aspect, embodiments disclosed herein relate to an artificial fracture system and a method for using the artificial fracture system for gel evaluation. Embodiments herein are directed toward methods and systems that may be useful to estimate the performance of any given PPG, the performance being physically simulated in a lab. Embodiments herein are also directed toward simulation testing while ensuring the homogeneity of the PPGs.

FIG. 1 shows a design of an artificial fracture system 100 to evaluate the blocking effectiveness of preformed particle gel (PPG) to fractures. The system includes a pump 101, an accumulator 102, an artificial fracture setup 103, and a pressure measurement system 104. In general, pump 101 is used to displace a PPG suspension from accumulator 102 into the artificial fracture setup 103, and the pressure measurement system 104 measures the pressure of fluids in various portions of the fracture model to evaluate the effectiveness of the PPG in blocking a fracture.

The pump 101 may be a positive displacement pump or a piston pump, for example, and may be used to provide a constant flow rate of hydraulic fluid or constant pressure to the accumulator via a flow line connecting a pump outlet 110 and an accumulator hydraulic fluid inlet 111. The hydraulic fluid may be understood to mean any liquid that may be used in the piston pump and can include any number of compounds that may be liquid, gas, or supercritical fluid that is readily available and may provide the desired pressure or flow rate control of the accumulator. Incompressible fluids, such as water, brine, light hydrocarbons or mixtures of various hydrocarbons or other fluids as commonly used as a hydraulic medium may be used. Water is the preferred hydraulic fluid used in pump 101 to drive the accumulator piston, but other fluids may also be used in situations when the pump 101 and/or accumulator 102 are to be used in an elevated temperature environment. The pump 101 may be used to inject a hydraulic fluid in the accumulator through the injection port of the accumulator and create pressure sufficient to move the piston from top to the bottom and displace test fluid in the accumulator.

The accumulator 102 may have a cylindrical shape with an internal chamber for holding a volume of fluid to be tested. Fluid may be understood to mean any mixture that may be tested as a plugging agent in an artificial fracture setup. An example of such a plugging agent may be microspheres, such as gel suspension in a carrier liquid. Within the accumulator is a floating piston that can move axially within the cylinder chamber in either direction by the differential pressure applied on both sides of the piston. Generally, the differential pressure is induced by injecting or withdrawing hydraulic liquid using pump 101. Injecting hydraulic fluid from pump 101 into the accumulator 102 may result in the plugging agent being tested to flow from the accumulator to the artificial fracture setup 103. If the hydraulic liquid is withdrawn via pump 101 from the accumulator 102, this may result in retraction of the piston. While the shape and material of the chamber are not limited, the accumulator 102 may be a piston container containing a test fluid, an example of which may be a gel suspension in a carrier liquid. The gel may be formed by polymeric crosslinking, such as preformed particle gels (PPG) and the carrier fluid may be any fluid utilized for fracturing applications, an example of which may be water. In some embodiments of the present disclosure, the accumulator may be fluidly connected to a fluid circuit system (not shown). The circuit serves to supply fluid, which may be the plugging agent or a suspension containing the plugging agent, for example, to the accumulator chamber through a fluid inlet, as well as discharge the fluid from the accumulator chamber via a fluid outlet.

An agitator may be provided in the accumulator, disposed on the side of the floating piston in which the test fluid is placed. The agitator may be a mechanical agitator, connected to a motor through a head of the accumulator. In other embodiments, a magnetic stirrer 109 may be provided in the bottom of the accumulator 102 in order to agitate the test fluid. Agitation may avoid precipitation of the solids suspended in the test fluid, such as a PPG suspension in water, that may be tested using the artificial fracture system. The magnetic stirrer 109 may be of different shapes, sizes and the material of construction may also vary, and an example of such a magnetic stirrer 109 may have a rod shape. The magnetic stirrer 109 may be placed inside accumulator 102 prior to injecting any fluid in the accumulator 102, and during, after fluid is inserted in the accumulator 102, the magnetic stirrer 109 may be used for ensuring homogenous mixing of the fluid, maintaining the particles adequately suspended. The magnetic stirrer 109 may rotate either clockwise or counterclockwise, or both clockwise and counterclockwise. By a clockwise and counterclockwise alternative stir, the magnetic stirrer 109 may keep any particles present in the fluid suspended homogenously in the accumulator 102.

During testing, the hydraulic fluid may be pumped via pump 101 into the accumulator 102. As a result, a test fluid may be pushed via the piston 116 from the accumulator 102 through the accumulator outlet 112 and fed via a flow line 114 to the fracture models of the artificial fracture setup 103 through artificial fracture setup inlet 113 for testing. A valve 115 may be disposed between the accumulator 102 and the artificial fracture setup 103 in order to control the test fluid flow rate within flow line 114. One or more valves may be provided to permit or restrict flow from the accumulator 102, such as between test intervals used for cleaning of the artificial fracture setup.

The artificial fracture setup 103, described further below, may be used for simulating a series of formation fractures. The artificial fracture setup may simulate the dynamic conditions inside a formation fracture, one such example of which may be simulating the flow path, pattern, and dynamics of plugging agents in one or more formation fractures. Plugging agents along with carrier fluids may be introduced in the artificial fracture setup through an accumulator inlet 111, as described above, by pump 101 pushing the hydraulic fluid over the piston 116 in the accumulator 102. This may create a pressure sufficient enough to push the test fluid from the accumulator 102 at a constant flow rate or a constant pressure through the accumulator outlet 112 and into the artificial fracture setup inlet 113 of the artificial fracture setup 103. Inside artificial fracture setup 103, gel-like plugging agents such as PPGs in water may form a gel plug in a fracture. When the plugging agent forms a plug in the fracture, the carrier fluid may leak through the packed gel or solid-like bed built up by the accumulation of the plugged gel. This may result in an increase in pressure inside the artificial fracture model at the fracture sections including the first model fracture section 117, the second model fracture section 118, and the third model fracture section 119, and eventually, the gel plug may become very low in permeability so even the carrier fluid cannot pass through. In one or more embodiments, the artificial fracture system may be used for evaluating PPGs or other plugging agents including bulk gels, resins, and cement.

The effectiveness of the plugging agents may be monitored via one or more pressure sensors. For example, a pressure measurement system 104 may be used to measure an artificial fracture setup inlet 113 pressure, as well as a pressure of the test fluid within the three fracture model fracture sections including a first model fracture section 117, a second model fracture section 118, and a third model fracture section 119 inside of the artificial fracture setup 103. The pressure measurement system 104, in some embodiments, may include one or more pressure sensors, a data collection unit, and a data processing unit. The pressure measurement system 104 may be connected with the artificial fracture setup 103 in order to measure pressure buildup within the three fracture model fracture sections during a testing operation. For example, the pressure measurement system 104 may include three pressure sensors, where a first pressure sensor 105 may be connected to the fluid inlet of a first model fracture section 117, a second pressure sensor 106 may be connected to the fluid inlet of a second model fracture section 118, and a third pressure sensor 107 may be connected to the fluid inlet of a third model fracture section 119. Other locations for the pressure sensors may also be used. These pressure sensors may send signals to a data collection and processing system 108. The pressure sensors including the first pressure sensor 105, the second pressure sensor 106, and the third pressure sensor 107 may be placed along the artificial fracture setup to monitor the injection pressure along each portion of the fracture, and the data collection and processing system 108 may record the real-time pressure data for analyses. When PPGs are used as plugging agents, the pressure sensors may record the pressure data for estimation of the PPG blocking efficiency in the artificial fracture model sections.

In one or more embodiments, the system may include one or more temperature sensors. One or more temperature sensors may be connected to the accumulator chamber, flow lines to the accumulator from the pump, and to the fracture model units from the accumulator, or within the fracture setup itself.

In one or more embodiments, the system may include a heating system for mimicking or simulating similar pressures and temperatures as may be encountered downhole, thus providing a simulation of plugging agents at downhole conditions. For this purpose, a heating unit may be in communication with the artificial fracture setup 103, and the artificial fracture system 100 may include water or oil baths or heat tracing and may be used to provide heating of the artificial fracture setup 103 in order to test the performance of plugging agents such as PPGs at simulated downhole conditions (T, P).

In one or more embodiments, the pump, the accumulator, the artificial fracture setup, and the pressure measurement unit may all be controlled through an automated computerized system. Further, each of the accumulator and fracture models may be configured so as to be disassembled for cleaning and reassembled for testing of additional plugging agents or test fluids.

Figure 2:
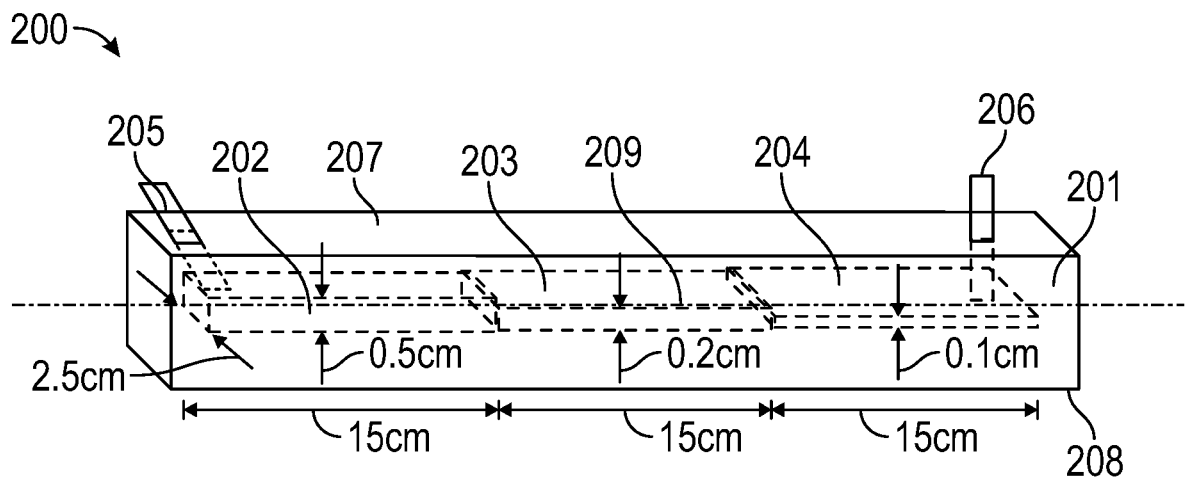
FIG. 2 is a schematic of a fracture model unit from a useful artificial fracture setup that shows shapes and dimensions of stainless-steel plates fitted with O-rings used in embodiments of the present disclosure.

An artificial fracture setup 103 according to embodiments herein may include a housing having a series of connected volumes or channels of descending thickness and/or width, simulating a fracture emanating from a wellbore. The artificial fracture setup 200 in FIG. 2 may be used in conjunction with FIG. 1 as artificial fracture setup 103. For example, as illustrated in FIG. 2, an artificial fracture setup 200 may be a cuboid block 201 with internal first void area 202 of the largest size, second void area 203 of intermediate size, and third void area 204 of the smallest size, may be used to simulate a fracture within a formation downhole. While illustrated with three void areas, a fewer or greater number of size reductions may be used in other embodiments.

To facilitate cleaning between tests, the artificial fracture setup may be formed using multi-piece construction. In some embodiments, for example, the fracture setup may be formed using an upper part 207 and a lower part 208, divided down the middle of each void area 209. While illustrated as having the void areas mirror imaged in the upper part and lower part 208, other multi-piece constructions of the fracture model may be used. For example, in one or more embodiments, the top or bottom piece of the artificial fracture model unit may be of a constant inner surface height while the other of the top or bottom may make step changes in the void area to achieve the desired artificial fracture model.

The artificial fracture setup may have an inlet or a fluid injection port 205, receiving test fluid flow from the accumulator. A fluid outlet or production port 206 may also be provided, simulating flow further into the formation, and may be used to monitor or measure flow through the fracture model.

The artificial fracture setup 200 has two cuboid halves. Three connected notches with different depths are made on each half. Assembly of the two halves may form a fracture model having a fracture of descending size (three fractures sections in series). While a metal-to-metal seal between the cuboid halves may be sufficient, an O-ring or other sealing ring may be used between the two halves to seal the fracture and prevent undesired flow or leakage from the fracture model during testing. The fractures are designed with a descending height to simulate the 3D contracted fracture in a reservoir. The fluid injection port 205 and production port 206 may be drilled on one of the halves with an obtuse angle to permit the flow of the test fluid into and out of the fracture. The outlet of the accumulator is connected with the fluid injection port 205 of the artificial fracture setup by a flow line with a sufficient inner diameter, such that particles suspended in the test fluid do not plug the flow line.

In one or more embodiments, the lengths and the widths of the fractures simulated may vary. For example, one fracture model used during testing may have a first void area that is 0.5 cm in height, a second void area that is 0.2 cm in height, and a third void area that is 0.1 cm in height. A second fracture model may have first, second, and/or third void areas of different heights, simulating other fracture sizes as may be encountered downhole. While illustrated as having step changes in height, fracture models may have gradual or sloped void areas. The artificial fracture model void areas may not have homogenous sizes, but rather may have abrupt contraction or expansion in sizes.

In one or more embodiments, the artificial fracture setup may have a shape that may mimic or simulate the three-dimensional flow in a real formation fracture. While actual fractures may have jagged or meandering flow paths, the cuboid void areas, such as those illustrated in FIGS. 1 and 2, have been found to sufficiently simulate fractures and provide for ease in cleaning between tests.

In one or more embodiments, the artificial fracture setup may have a cylindrical void shape that may mimic or simulate the three-dimensional flow in a real formation fracture.

FIGS. 1 and 2 illustrate an artificial fracture setup having three void areas as three model fracture sections. In one or more embodiments, four or more different volumes of three-dimensional shapes may be connected in series to form an artificial fracture setup.

In one or more embodiments, the orders of the different volumes may vary. Two or more different sub-volume in parallel inside one of the volumes may also be present in one or more embodiments.

In one or more embodiments, the artificial fracture setup may be made of high-stress resistant materials, including stainless steel, which may be used in high-temperature and high-pressure conditions. If desired, view windows may also be provided for visual observation of the test fluid within the fracture model.

Figure 3:
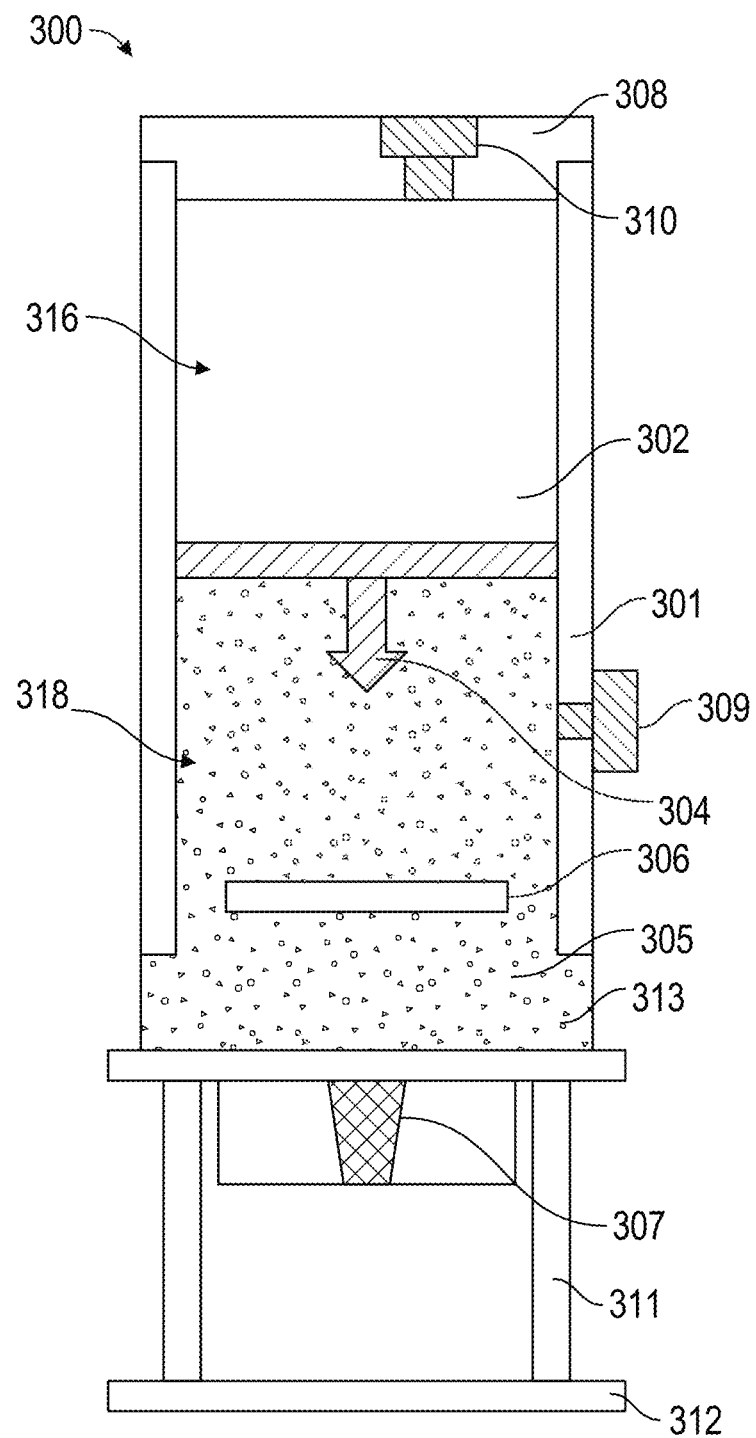
FIG. 3 is a schematic of a piston accumulator system used in embodiments of the present disclosure.

FIG. 3 illustrates an accumulator 300 that may be used as accumulator 102 in embodiments herein. Accumulator 300 may include an accumulator cylinder 301 that may provide housing for a test fluid 313, disposed of in which is a floating piston 304, and a magnetic stirrer 306 that may be used to maintain suspension of the microsphere particle gels 305 in the carrier liquid of the test fluid 313. The accumulator cylinder 301 may sit on legs 311 and base 312. The accumulator 300 may have a seal 308 on the top. The floating piston 304 within the accumulator cylinder 301 chambers may move freely vertically inside the accumulator cylinder 301 and may separate the hydraulic fluid 302 and the test fluid 313. The floating piston 304 separates an upper accumulator chamber 316 and a lower accumulator chamber 318 of the accumulator 300. The hydraulic fluid 302 may be either gaseous or liquid. When the hydraulic fluid 302 is injected in the accumulator cylinder 301, this may create a pressure over the floating piston 304 which then may result in pushing the test fluid 313 to pass through the out port 307 of the accumulator. The magnetic stirrer 306 may be used for continuous mixing of the microsphere particle gels 305 that are present in the test fluid 313, The out port 307 of the accumulator may be located at the lowest position to help the microsphere particle gels 305 and the test fluid 313 to flow out. The clockwise and counterclockwise alternative stir function of the magnetic stirrer 306 may avoid swirling in one direction and make the particle easy to enter the out port 307. The accumulator cylinder 301 may have a charging port 309 on the side, such as for connecting with a second vessel or accumulator if needed, and a connection port 310 on top of the accumulator cylinder 301 for connecting with pump 101. The charging port 309 may be used to introduce the plugging agent such as PPG suspensions into the accumulator through injection or other methods for testing. The charging port 309 may be located on a lower portion of the accumulator cylinder 301, below a lowermost level of floating piston 304 so that the PPG suspensions may be loaded into the accumulator, pushing the piston upward and filling the accumulator's lower chamber. The connection port 310 may be used as a hydraulic fluid (gas/liquid) inlet that is connected to pump 101, where a volume of hydraulic fluid 302 displaced by pump 101 displaces a similar volume of test fluid 313, such as a suspension of PPGs in water, from the accumulator into the flow line and hence to the artificial fracture setup 200.

In one or more embodiments, the accumulator may be made of stainless steel, which can be used in high-temperature and high-pressure conditions.

Figure 4:
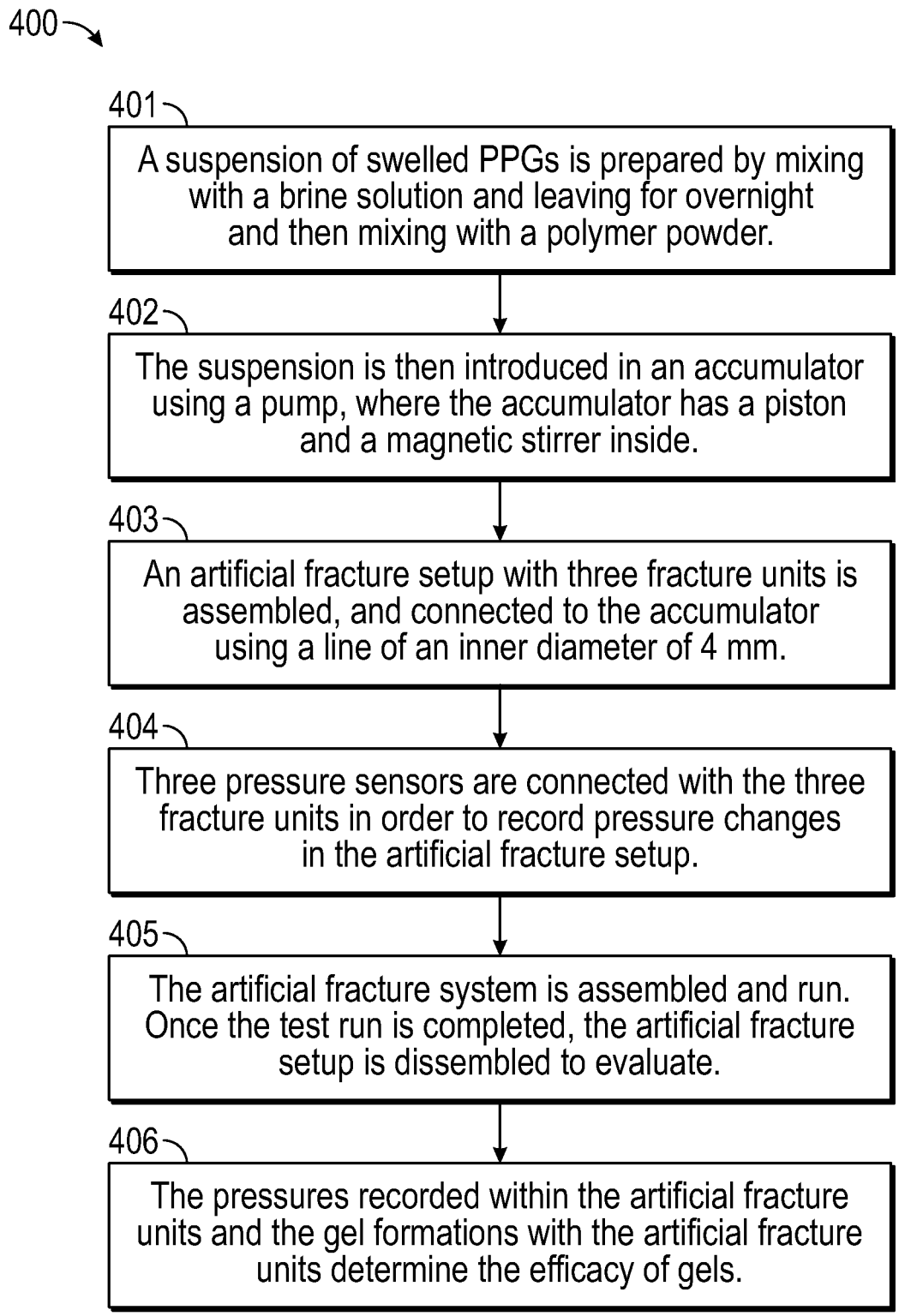
FIG. 4 is a flowchart that illustrates steps included in the method of ensuring homogeneity of gels in an accumulator, injecting fluid in a fracture, and measuring pressure at different points of the designed system in accordance with one or more embodiments.

FIG. 4 is a flowchart 400 that illustrates steps included in the method of ensuring homogeneity of plugging agents in an accumulator, injecting test fluids containing plugging agents into a fracture setup, and measuring pressure at different points of the designed system in accordance with one or more embodiments. As a first step 401, a test fluid sample is prepared. For example, PPGs suspension is prepared by first mixing with a brine solution, and then mixing with a polymer powder. In step 402, the suspension is then introduced in an accumulator using a pump, where the accumulator has a piston and a magnetic stirrer inside. In step 403, an artificial fracture setup with one or more artificial fracture model units is assembled and fluidly connected to the accumulator using a flow line of sufficient inner diameter to avoid blockage by the suspension. In next step 404, one or more pressure sensors are connected with the artificial fracture model units in order to record pressure changes across the artificial fracture setup. After assembling the fracture model, including sensors, the accumulator and the artificial fracture setup are fluidly connected. If needed, the artificial fracture setup may be heated using an external heating unit to simulate fractures in a real hydrocarbon reservoir. Then the artificial fracture system is assembled and run. The hydraulic fluid in the pump is pushed to move the accumulator piston, therefore, pushing the test fluid towards the outport of the accumulator and injecting test fluid into the fracture setup. During the testing, pressure, temperature, or any other parameter (if needed) are monitored to determine the effectiveness and other properties of the plugging agent. In step 405, the artificial fracture setup is dissembled once the test run is completed to evaluate any plug formation in the fractures. Based on the pressures recorded within the artificial fracture model units and the plug formations with the artificial fracture model units, in step 406, the efficacy of plugging agents can be determined.

In one or more embodiments, the inner diameter of the line that is used for fluid communication throughout the system may be in the range from 4 to 10 mm. In other embodiments, the inner diameter of the line may be at least 3 times, or at least 5 times, or at least 10 times the diameter expected for the expanded particles to be suspended within the test fluid. In one or more embodiments, a plurality of artificial fracture model units may be tested for gel evaluation using an artificial fracture setup.

EXAMPLES

The following examples are merely illustrative and should not be interpreted as limiting the scope of the present disclosure.

Example

An experiment was conducted in a laboratory environment in order to demonstrate the test procedure and efficacy of preformed particle gels in an artificial fracture setup as described above.

A prototype of the artificial fracture system was built according to the design shown in FIG. 1. FIG. 3 shows the cross-sectional schematic of the piston accumulator with a magnetic stirrer at the bottom.

Polymer ($M_w$=14 million g/mol) was obtained from Anhui Tianrun Chemical Industry Company, China. The purity was 89%. PPGs were purchased from HOPEC Oil Company, China and the purity was 99%.

A PPG sample was first prepared in a laboratory environment and then was introduced in an artificial fracture model through injection by utilizing a pump, an accumulator, and pipeline assembly as a prototype. The PPGs had an average diameter of 0.43 mm having a water content lower than 1%. Then the PPGs were immersed in a brine solution having a salinity of 2425 mg/L. After swelling in the brine solution for 2 hours, the diameter increased to 2.4 mm. The test procedures are listed below.

First, to prepare the PPGs sample, 90 grams of dried PPGs were mixed in 0.5 L of brine solution using a mixer at room temperature. The brine solution had a NaCl concentration of 2425 mg/L. After mixing for 60 minutes, the PPGs in brine mixture or suspension was then allowed to fully rest overnight. This resulted in swelling of the PPGs.

Next, a polymer powder was added into the PPGs in brine suspension and the polymer-PPGs-brine mixture was stirred at a rate of 800 r/min until completely dispersed. The dispersed PPGs in the brine suspension were not dissolvable, rather swellable and/or shrinkable. PPGs, as swollen particles, tend to sink during flowing in lines and fractures. The polymer can increase the viscosity of the water phase and improve the suspension of PPG. Water-soluble polymers may be utilized for this application. Non-limiting examples of such polymer may be polyacrylamide and xanthan]

The polymer-PPGs-brine suspension was then introduced into the accumulator. The magnetic stirring was present in the bottom of the accumulator to ensure well mixing inside of the accumulator. The artificial fracture setup including three fracture model units was assembled with a pressure sensor attached to each of the fracture model units. Next, the accumulator was connected with the artificial fracture setup and the pressure measurement model unit using lines having an inner diameter of 4 mm. The lines were constructed of metal tubes such as stainless steel, Hastelloy, or Titanium alloy used as a material of construction. The inner diameter of the lines was 4 mm to allow the particles to pass through the lines. The thickness of the lines or tube walls was about 1 mm or more for high pressure. The test polymer-PPGs-brine mixture sample was stirred continuously at a clockwise and counterclockwise rotation alternatively at a time interval of 1 min to ensure homogenous mixing.

The polymer-PPGs-brine suspension was injected into the artificial fracture setup at a flow rate of 5 ml/min for 1 hour. The pressure along the fractures was recorded using the attached pressure sensors and the pressure monitoring system.

After running the above test for 1 hour, the fracture setup was disassembled and the gel pack formed in the fractures was evaluated.

Figure 5:
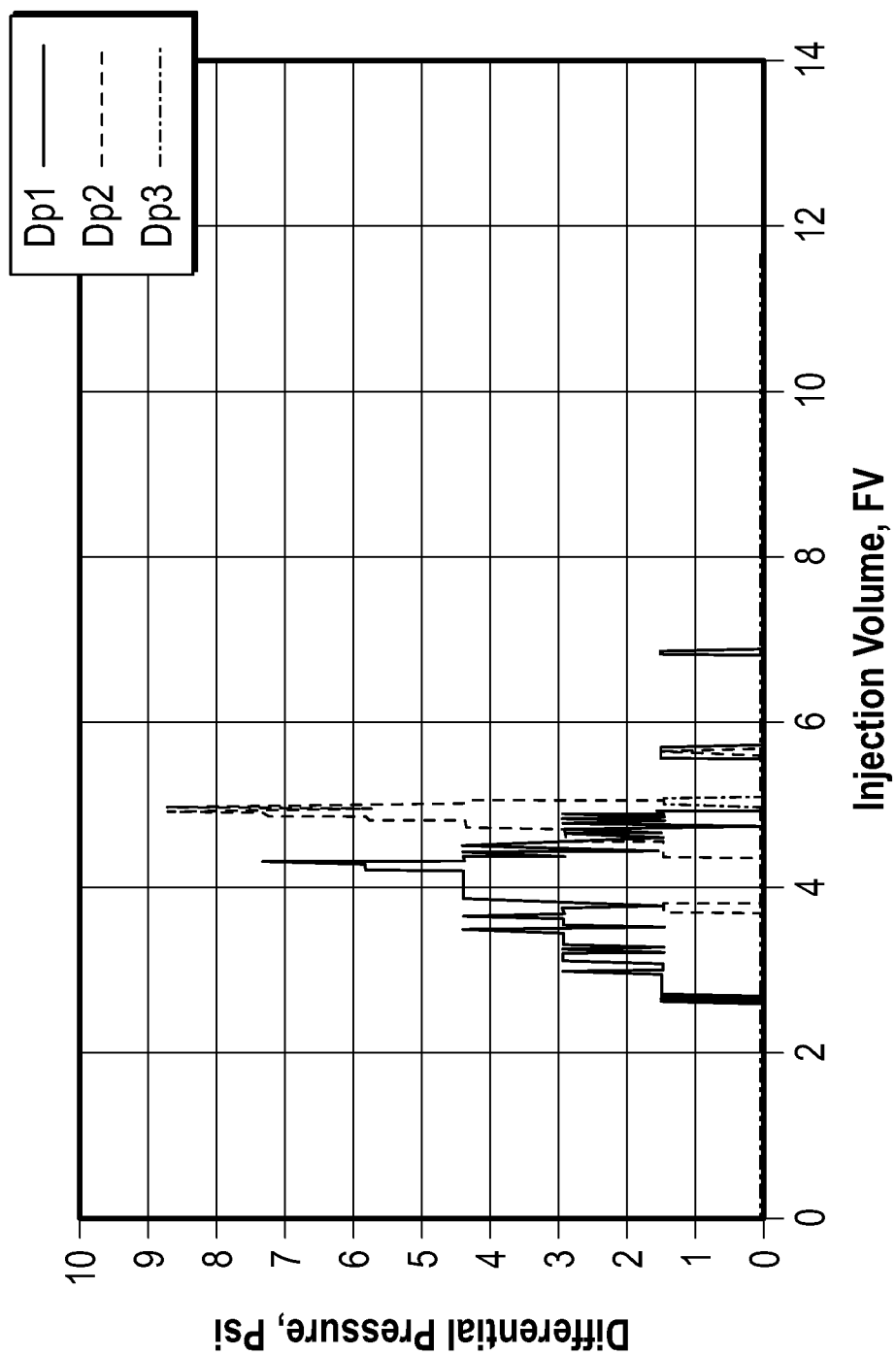
FIG. 5 is a graph showing pressure during PPGs injection in an artificial fracture illustrating an example in accordance with one or more embodiments.

FIG. 5 is a graph showing the pressure build-up profiles measured in the three fractures. The differential pressure in the first fracture was first built up, indicating the particle entered the fracture and produced blocking. The pressure increase was not straightforward but with pressure vibration. A small amount of PPG particles could be observed in the outlet. When the absolute pressure value was above a certain threshold, there was an abrupt pressure release to a very low value. A large amount of PPG samples was observed from the outlet. At the same time, the pressure in the second fracture started to build up. The pressure increased much more quickly with a higher maximum value in the second fracture than in the first one. After a breakthrough in the second fracture, the pressure in the third fracture starts to increase. But the maximum value was not very high and was released very quickly. After that, the pressures in the three fractures all became very low, although the PPG injection was not stopped. No effective pressure build-up was observed till the end of the test. The results show that the PPG particles were successfully injected into the fracture through the design.

In one or more embodiments, the effectiveness of plugging agents may be measured and evaluated in a testing environment that simulates the dynamic geometry of a real-world fracturing operation, and in particular, a real downhole fracture diversion operation. As described above and seen in at least FIG. 5, the amount of plugs in artificial fractures may be varied much like plugs in a real formation fracture may change (whether along the length of complex geometry or due to changes in downhole conditions). Thus, the effectiveness of the plugging agent may be measured, particularly how the pressure is generated due to the plug formations and restrictions of fluid flow in the formation fractures.

Embodiments of the present disclosure may provide at least one of the following advantages. There is no design to keep the PPG suspended in water stably in the conventional methods. In order to successfully apply in real situations, any laboratory testing requires mimicking the real situation. With conventional test methods, the chemical blocking agents tend to precipitate quickly in an accumulator, and thus, it is hard to inject chemical blocking agents into a fracture. The three-dimensional configurations of the fractures in the reservoir create complexity for the use of the conventional tube method. Therefore, the conventional tube method cannot completely mimic the flow in real fractures. The invented system is designed to overcome this challenge by ensuring more controllable particle gels flow. The setup can be cleaned up and reused. It is also possible to use it to test different materials like bulk gels, resins, and cement.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" is used, this term may mean that there can be a variance in the value of up to ±10%, of up to 5%, of up to 2%, of up to 1%, of up to 0.5%, of up to 0.1%, or up to 0.01%.

The term "substantially", when used, refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

While one or more embodiments of the present disclosure have been described with respect to a limited number of embodiments, those skilled in the art, having the benefit of this disclosure, will appreciate that other embodiments can be devised, which do not depart from the scope of the disclosure. Accordingly, the scope of the disclosure should be limited only by the attached claims.

What is claimed:

1. A system for a plugging agent evaluation or to estimate the performance of a plugging agent in a fracture of an oil-containing reservoir, the system comprising a pump, an accumulator, an artificial fracture setup, and a pressure measurement system, wherein:
   the accumulator comprises a floating piston separating an upper accumulator chamber and a lower accumulator chamber;
   the pump is fluidly connected to the upper accumulator chamber;
   a magnetic stirrer is disposed within the lower accumulator chamber, and the lower accumulator chamber is fluidly connected to the artificial fracture setup;
   the artificial fracture setup comprises a plurality of fracture model units comprising void areas configured to simulate formation fractures; and
   the pressure measurement system is configured to measure a pressure at one or more locations within the artificial fracture setup.

2. The system according to claim 1,
   wherein the accumulator further comprises an out port proximate a lowest point of the lower accumulator chamber and an injection port disposed intermediate the out port and the floating piston.

3. The system according to claim 2,
   wherein the out port of the accumulator is fluidly connected with an injection port of the artificial fracture setup by a flow line.

4. The system according to claim 3, wherein the flow line fluidly connecting the out port to the injection port has an inner diameter at least 3 times a diameter of particles contained in a test fluid disposed within a lower accumulator chamber.

5. The system according to claim 1,
   wherein the magnetic stirrer is configured to be rotated both clockwise and counterclockwise.

6. The system according to claim 1,
   wherein the pressure measurement system comprises:
   a plurality of pressure sensors where the plurality of pressure sensors is configured to measure pressure at locations along the plurality of fracture model units; and
   a data collection system.

7. The system according to claim 1,
   wherein the artificial fracture setup comprises:
   two stainless steel cuboid halves, including an upper half and a lower half; and
   void areas within each of the upper half and lower half, wherein the void areas of the upper half and the lower half are similar and configured such that when the upper half and the lower half is assembled, a plurality of artificial fracture model units of different cross-sectional areas is formed.

8. The system according to claim 7, wherein the artificial fracture setup comprises an inlet fluidly connected to the accumulator, wherein the inlet is at an obtuse angle relative to the plurality of artificial fracture model units.

9. A method of gel evaluation using an artificial fracture system, the method comprising:
assembling a pump, an accumulator, a pressure measurement system, and an artificial fracture setup having a plurality of artificial fracture model units in series, where the plurality of artificial fracture model units mimics a fracture in a hydrocarbon reservoir;
injecting a plugging agent into the artificial fracture setup from the accumulator through a connecting line;
measuring pressures in the artificial fracture setup while injecting the plugging agent;
disassembling the artificial fracture setup; and
measuring a plugging efficacy of the plugging agent based on pressure data and gel formations formed within the artificial fracture setup.

10. The method according to claim 9, wherein the plugging agent is any of following:
polymeric systems;
particle gels with a diameter ranging from 0.01 to 10 mm; and
composite gels with a diameter ranging from 100 to 10000 nm.

11. The method according to claim 9, wherein, the method includes one or more of the following:
preparing a suspension comprising a pre-formed particle gel as the plugging agent and a carrier fluid prior to introducing in the accumulator;
monitoring a suspension flow from an out port of the accumulator using at least a valve; monitoring temperature of the suspension in the accumulator, in the connecting line, and in plurality of artificial fracture model units using one or more temperature sensors; and
heating the artificial fracture setup using an external heating unit.

* * * * *